United States Patent
Menge

[15] 3,680,609
[45] Aug. 1, 1972

[54] CUTTING APPARATUS

[72] Inventor: Donald C. Menge, Warren, Mich.

[73] Assignee: Troy Steel Corporation, Troy, Mich.

[22] Filed: Dec. 28, 1970

[21] Appl. No.: 101,843

Related U.S. Application Data

[63] Continuation-in-part of Ser. No. 752,918, Aug. 15, 1968, Pat. No. 3,578,043.

[52] U.S. Cl..................143/46 E, 143/6 H, 143/6 R
[51] Int. Cl. ..............................................B27b 5/18
[58] Field of Search...........143/6, 6 H, 6 G, 46, 46 E; 74/103

[56] References Cited

UNITED STATES PATENTS

| | | |
|---|---|---|
| 1,662,087 | 3/1928 | Thomas et al...74/103, 143/46E |
| 2,535,182 | 12/1950 | Weaver.......................143/46 E |
| 2,551,130 | 5/1951 | Hunt et al....................143/46 E |
| 2,719,550 | 10/1955 | Groves.........................143/46 E |
| 3,538,963 | 10/1970 | Adams..........................143/6 R |

*Primary Examiner*—Donald R. Schran
*Attorney*—Hauke, Gifford & Patalidis

[57] ABSTRACT

An apparatus for cutting an elongated workpiece at a selected angle with respect to the longitudinal axis of the workpiece. The apparatus has a power saw mounted to an upright support member which provides for horizontal movement of the power saw back and forth along a straight line across the workpiece; the upright support member being rotatable about a vertical axis to align the power saw along a desired cutting pitch angle. The upright support member has a pair of upwardly extending rocket arms rotatably mounted proximate their lower portions to the upright support, while the upper portions of the rocker arms are rotatably mounted to an upper power saw carrying member on which the power saw is, in turn, carried for pivotable movement to and away from the workpiece independent of its horizontal motion. A pivot and slot arrangement disposed intermediate the opposite rotational axes of the rocker arms cooperate with the upright support as the lower portion of the rocker arms rotate through a predetermined arcuate path so as to impart a horizontal motion to the upper power saw carrying member. A stop member is carried by one of the rocker arms and engages the other rocker arm after a predetermined amount of stroking movement to limit such horizontal movement by a predetermined amount.

14 Claims, 5 Drawing Figures

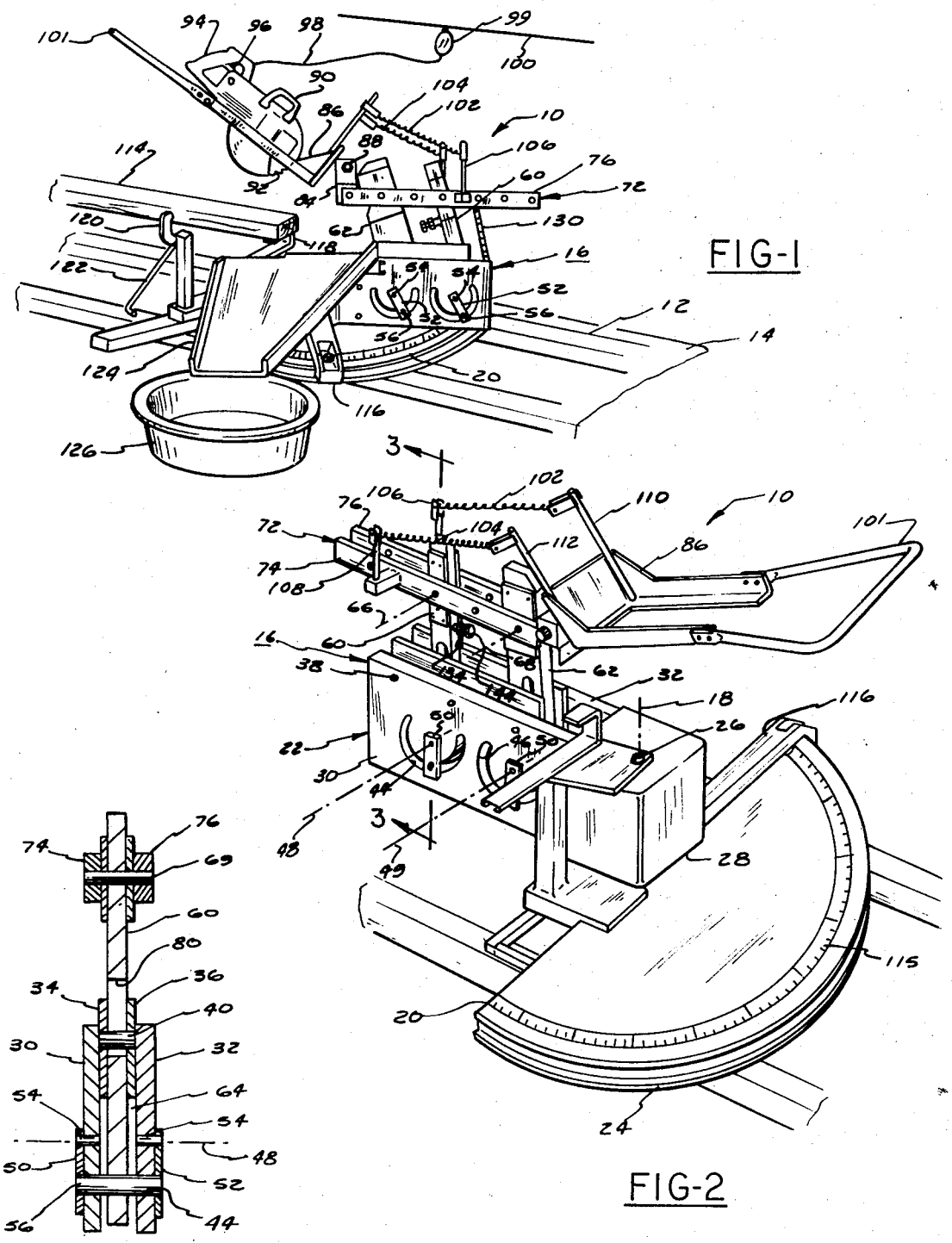

INVENTOR
DONALD C. MENGE

CUTTING APPARATUS

CROSS REFERENCE TO RELATED APPLICATIONS

This application is a continuation-in-part of my co-pending application Ser. No. 752,918 filed Aug. 15, 1968, now U.S. Pat. No. 3,578,043.

BACKGROUND OF THE INVENTION

1. Field of the Invention

The present invention relates to an apparatus for translating mechanical motion, and, more particularly, to an apparatus for cutting an end of an unfinished workpiece for the purpose of obtaining a ready-cut element adapted for a predetermined use.

2. Description of the Prior Art

In my above mentioned co-pending application, a novel cutting apparatus is disclosed which permits an operator to cut unfinished workpieces to a particular desired shape, such as cutting unfinished lumber to shape for use as webs, diagonals, cords, and other elements for prefabricated building trusses. This apparatus comprises an elongated frame having a slideway with a pair of carriages movably mounted thereon for movement toward and away from one another. A clamping device carried by the frame provides means for positioning the unshaped workpiece in a desired horizontal position above the slideway. Each carriage carries an angularly adjustable power driven saw mounted for motion about a horizontal axis to permit back and forth movement of the power saw relative to the longitudinal axis of the workpiece to perform the cutting operation at a desired pitch angle.

Although the apparatus described in my co-pending patent application functions in a satisfactory manner and represents a substantial improvement over the prior art devices, the present invention provides an improved structure for imparting horizontal back and forth motion of the power saw in a horizontal plane while permitting angular adjustment of the power saw relative to the longitudinal axis of the workpiece, such structure also finding use in other machines in which pivotal motion needs to be translated into linear motion.

SUMMARY OF THE INVENTION

The present invention, which will be described subsequently in greater detail, comprises an apparatus for cutting a workpiece at selected angles with respect to the longitudinal axis of the workpiece. In the preferred embodiment, the apparatus is adapted to function in conjunction with a longitudinal support frame provided with slides on which the cutting apparatus is mounted for slidable movement with respect to the longitudinal axis of the frame. Normally, two such apparatuses are mounted on the support frame for movement toward and away from each other so that workpieces of varying longitudinal lengths may be accommodated. Intermediate the cutting apparatuses, the support frame carries one or more workpiece clamping devices to permit mounting of the workpieces in a longitudinal direction between the cutting apparatuses.

Each cutting apparatus comprises a semi-circular plate, the lower portion of which engages the support frame slides for movement relative thereto, while the upper portion of the plate has a power saw carriage secured thereto and adapted for rotation about the semi-circular plate on a vertical axis in a manner which was described in greater detail in my aforementioned co-pending application.

The saw carriage includes a lower support member having a pair of parallel, horizontally spaced rocker arms which are connected to the lower support member in such a manner as to permit relative rotational movement between the lower portions of the rocker arms along a predetermined arcuate path. An upper support member is attached for relative rotational movement to the upper portion of each rocker arm and carries the power saw at one end in a manner which permits pivotal movement of the saw about a horizontal axis independent of the horizontal back and forth movement of the upper support member. A pivot and slot arrangement disposed between the rocker arms and the lower support member cooperate with the lower rotational movement of the rocker arms about its predetermined arcuate path to impart a horizontal back and forth motion upon the saw carrying upper support member to permit the power driven saw to traverse the workpiece. The arrangement permits a straight horizontal back and forth movement of the power driven saw upon application of a manual push or pulling force thereto during the cutting operation on the workpiece.

A novel stop member carried by one of the rocker arms is adapted to engage the other rOcker arm at the extreme ends of the back and forth rocking movement to limit said movement. The stop member is adjustable to permit the amount of horizontal movement of the power saw to be selectively varied to accommodate various cutting operations.

The lower support carries an index arm to travel around the semi-circular plate which, in turn, is provided with a scale indicating angular points around the arc of the semi-circular plates to allow positioning of the saw carriage at any desired angular position with respect to the longitudinal axis of the workpiece; such position depending upon the desired cutting pitch for a particular workpiece.

The power driven saw mounted on the saw carriages may be of the conventional circular hand-saw type driven electrically with the electric cables from the power source mounted in overhead fashion on slidable pulleys so as not to interfere with the operation of the cutting apparatus and the free movement of the saw carriages.

It is therefore an object of the present invention to provide a new and improved structure for translating pivotal motion into linear motion.

It is also an object of the present invention to provide a new and improved structure for imparting a horizontal back and forth stroking motion for a machine, such as a power driven saw.

Other objects, advantages and applications of the present invention will become readily apparent to those skilled in the art of cutting apparatuses when the accompanying description of one embodiment of the best mode contemplated for practicing the invention is read in conjunction with the accompanying drawings.

3

BRIEF DESCRIPTION OF THE DRAWINGS

The description herein makes reference to the accompanying drawings wherein like reference numerals refer to like parts and in which:

FIG. 1 is a perspective view of a preferred form of a cutting apparatus embodying the principles of the present invention;

FIG. 2 is a perspective view of the cutting apparatus illustrated in FIG. 1 wherein selected components are removed;

FIG. 3 is a fragmentary cross-sectional plane view of FIG. 2 as seen substantially along line 3—3 thereof;

DESCRIPTION OF THE PREFERRED EMBODIMENT

Figure 4:
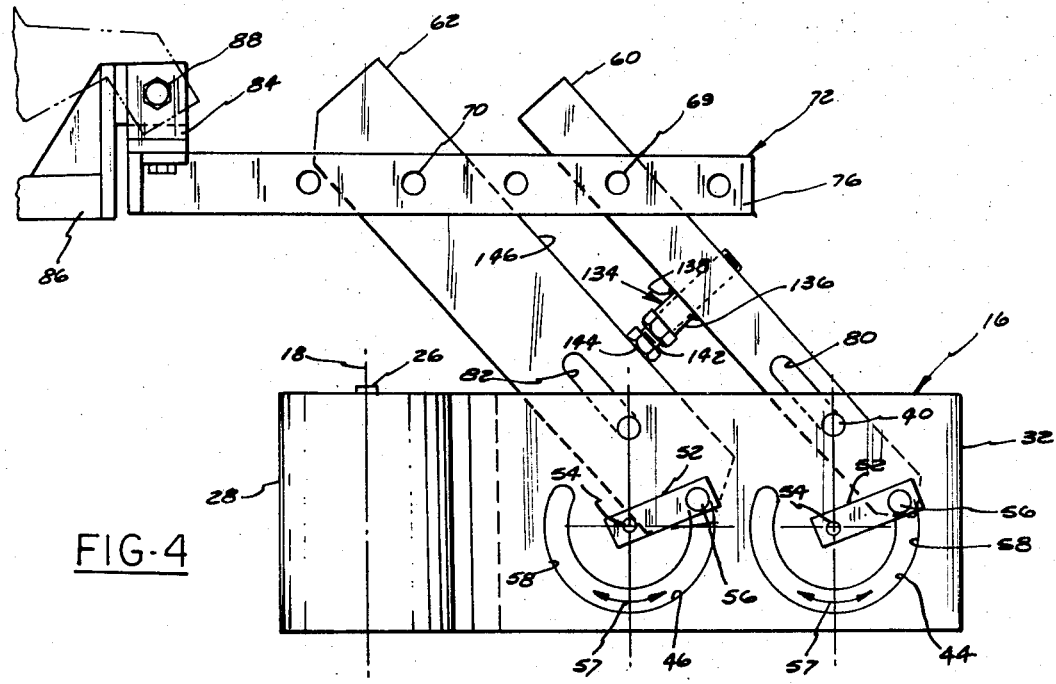
FIG. 4 is a fragmentary plane view of the cutting apparatus shown in FIG. 1 illustrating the extent of horizontal travel in one direction.

Referring to the drawings and particularly FIGS. 1 and 2 wherein there is illustrated a preferred embodiment of the present invention in the form of a cutting apparatus 10 supported for sliding engagement on a pair of parallel rails 12 secured to a longitudinal support frame 14.

The cutting apparatus 10 comprises a saw carriage 16 and a horizontally disposed substantially semi-circular plate 20, which in turn is provided on its underside with slides (not shown) engageable with the rails 12 on the support frame 14 to enable the saw carriage 16 to move to any desired position along the longitudinal axis of the support frame 14. A lower support member 22 is mounted for rotational movement about a vertical axis 18 (FIG. 2) with respect to the horizontally disposed semi-circular plate 20 at the inner end thereof opposite its outer periphery 24. Rotational movement of the lower support member 22 is provided by means of a pivot pin 26 extending through a square pivot tube 28 and into the semi-circular plate 20. The construction and the manner of operation of the pivot tube 28 and the pivot pin 26 is fully described in my aforementioned patent application and a further detailed description of the pivot tube 28 and the pivot pin 26 herein is not necessarY.

Figure 5:
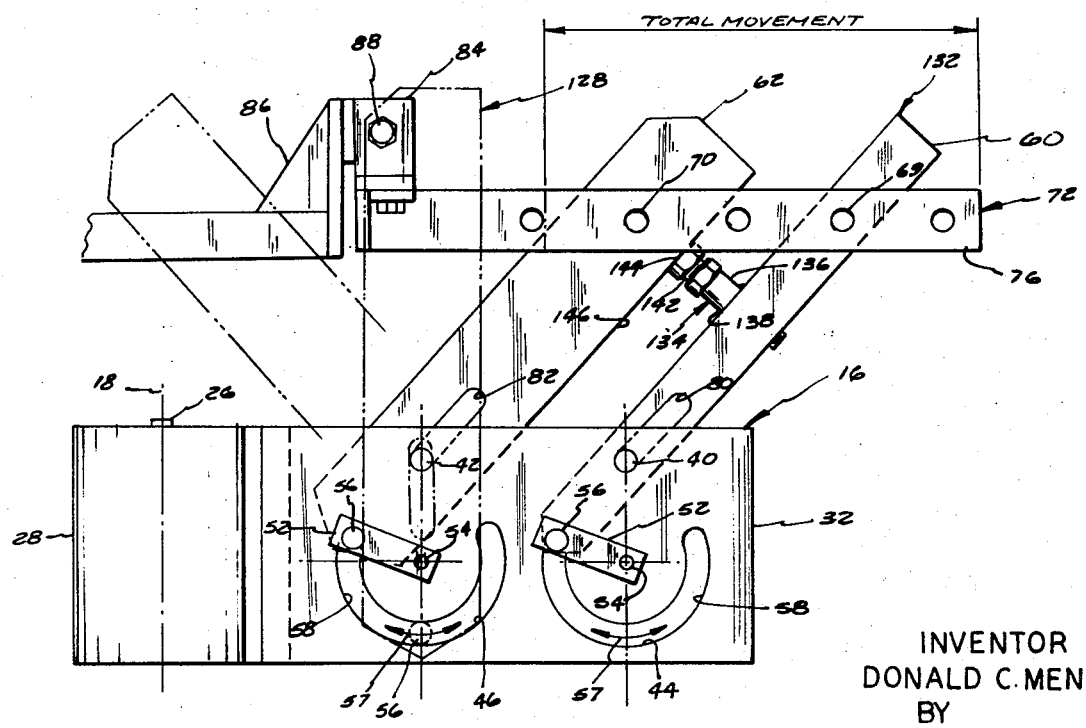
FIG. 5 is a fragmentary plane view of the cutting apparatus shown in FIG. 1 and similar to the view of FIG. 4, illustrating the extent of horizontal travel in an opposite direction.

The lower support member 22 is further comprised of a pair of parallel spaced upright portions 30 and 32 which extend from the pivot tube 28 and are attached thereto by any suitable means, such as by welding. The upright portions 30 and 32 are provided with a pair of inner plates 34 and 36 attached to the inner opposing faces of the upright portions 30 and 32 by any suitable means, such as by screws 38. A pair of trunnion pins 40 and 42, which are clearly illustrated in FIGS. 3, 4 and 5, are fixedly attached to the inner plates 34 and 36 by any suitable means for a purpose which will be described in greater detail hereinafter.

Each of the upright portions 30 and 32 has a pair of arcuate openings 44 and 46, which in the preferred embodiment are of a circular form having arcuate axes, the radius of which extend from horizontal axes, respectively indicated by the numerals 48 and 49.

4

Two pairs of connecting arms 50 and 52 are respectively mounted for rotational movement on opposite outer faces of the upright portions 30 and 32 about the horizontal axes 48 and 49 by means of trunnion pins 54 (FIG. 3). The lower ends of each pair of connecting pins 50 and 52 are attached by connecting pins 56. The horizontal axis of the connecting pins 56 coincides with the arcuate axis of the openings 44 and 46 and thus the pins follow an arcuate path 57 defined by the openings 44 and 46. Each connecting pin 56 is so sized that the bottom portion thereof abuts a lower outer surface 58 in each openings 44 and 46 such that any downwardly directed force, which will be described in greater detail hereinafter, is transmitted from the connecting pin 56 to the surface 58, and thus to the upright portions 30 and 32, and not through the connecting arms 50 and 52. Thus, the connecting arms 50 and 52 act only to guide the connecting pins 56 within the arcuate openings 44 and 46 and are not adapted to act as load carrying components.

A pair of upright rocker arms 60 and 62 are disposed in the space 64 (one only being shown in FIG. 3) defined between the opposing inner faces of the upright portions 30 and 32; the lower portions of each rocker arm engaging the connecting pins 56 for relative rotational movement about the longitudinal axis of the connecting pins 56. Since the connecting pins 56 are rotatable with respect to the axes 48 and 49 by means of the connecting arms 50 and 52, the lower portion 5 of each rocker arm 60 and 62 are adapted to follow the arcuate path 57 defined by the openings 44 and 46, respectively.

The upper portion of each rocker arm 60 and 62 is mounted for rotational movement to an upper support member 72 about the horizontal axes 66 and 68 (FIG. 2) respectively by means of upper trunnion pins 69 and 70 (FIG. 4). The upper support member 72 comprises a pair of spaced parallel horizontally disposed plates 74 and 76. The upper portions of the rocker arms 60 and 62 are disposed between the inner opposing faces of the plates 74 and 76 with the trunnion pins 69 and 70 extending horizontally therethrough. It should be noted that the distance between the horizontal axes 66 and 68 is substantially equal to the distance between the horizontal axes 48 and 49.

The rocker arms 60 and 62 are further provided with a pair of elongated slots 80 and 82 through which the trunnion pins 40 and 42 respectively (one only being shown in FIG. 4) extend and which cooperate in a manner to be described in greater detail hereinafter. The longitudinal axis of the upper support member 72 normally extends horizontally above the vertically disposed pivot pin 26, intersecting the vertical axis 18. One end of the upper support member 72 has an upright mounting member 84 fixedly attached thereto. The upper portion of the mounting member 84 carries a saw support 86 which is pivotably mounted to trunnion pin 88 for up and down movement with respect to the plate 20. The saw support 86 in turn carries a conventional circular electric power driven saw 90 (FIG. 1) with its cutting blade 92 extending downwardly between the outer portion of the saw support 86. The power saw 90 has a hand-grip 94 provided with a start and stop trigger 96 and an electrical cable 98 extending from the saw upwardly over a pulley 99 moveably suspended from an overhead support line 100 so that the electrical cable 98 will not interfere with the normal operation of the cutting apparatus 10 and does not hinder the free movement of the saw carriage 16. The saw support 86 has a handle 101 which the operator grasps to pivot the saw 90 toward the plate 20 and to impart a back and forth rocking motion to the saw 90 in a manner which will be described in greater detail hereinafter. The saw 90 is normally biased in an upwardly direction away from the plate 20 by means of a pair of springs 102 and 104 respectively attached at one end to upright rods 106 and 108 carried by the upper support member 72, and at the other spring ends by upright rods 110 and 112 which are suitably attached to the saw support 86. It can thus be seen that by grasping the saw support handle 101 and pivoting the saw support 86 about the mounting member trunnion pin 88 in a downwardly direction, the saw 90 will be brought into contact with a workpiece 114; and, upon releasing the handle 101, the springs 102 and 104 will cause the saw support 86 and thus the saw 90 to pivot in an upwardly direction out of the way of the operator who may then handle the workpiece 114 as desired without interference from the saw 90.

The semi-circular plate 20 is provided with a radial scale 115 in the form of an indicia spaced at convenient angular intervals to indicate the degree of angular position of the saw carriage 16 in relation to the longitudinal center line of the workpiece 114. An indicator arm 116, attached to the pivot tube 28, extends across the semi-circular plate 20 and provides a means for indicating the position of the saw carriage 16 with respect to the semi-circular plate 20.

The cutting apparatus 10 is provided with a suitable workpiece support 118 (FIG. 2) adjacent the pivot tube 28 to support the ends of the longitudinal workpiece 114. The support 118 is attached to the back side of the plate 20 by any suitable fastening means, such as by welding. A second workpiece support 120 (FIG. 1) is provided with a suitable clamping means 122 and is attached on the support frame 14 either in a permanent fashion or in a manner which permits it to be movable with respect to the rails 12 as the particular application may require. The clamp may be of the quick-release swing type disclosed in my aforementioned co-pending application and may be so designed as to hold one or more workpieces 114 as necessary to align the longitudinal axis of the workpiece 114 with respect to the saw carriage 16 to permit cutting of the ends of the workpiece 114, as will be described in greater detail hereinafter.

Referring to FIG. 1, there is illustrated a chute 124 provided at the saw carriage 16 adjacent the point at which the saw 90 will engage workpiece 114. The chute 124 is attached to the saw carriage 16 and rotatable therewith so as to collect the sawed-off sections of the workpiece 114 as the sections fall and direct them to a suitable scrap container 126 positioned underneath the chute 124.

Referring now to FIGS. 4 and 5 for a detailed description of the manner in which the saw 90 is maintained in a horizontal plane as the saw 90 is stroked back and forth with respect to the longitudinal axis of the workpiece 114 so as to cut the same at a selected angle. Normally, when the saw carriage 16 is disposed in a neutral position, that is the rocker arms 60 and 62 are in the straight vertical position as partially shown at 128 in phantom in FIG. 5, the connecting pins 56 are at the lowest point on the arcuate path 57 and the upper trunnion pins 40 and 42 are proximate the upper portion of the elongated slots 80 and 82. A coil-type spring 130, (FIG. 1) disposed between one end of the upper support member 72 and the lower support member 22, exerts a biasing force on the upper support member 72 when it is horizontally displaced in either direction from the neutral position 128, and thus, when the saw support handle 101 is released by the operator, the spring 130 will normally bring the apparatus to its neutral position 128, which as can be seen in FIG. 2 brings the saw away from the workpiece 114 and out of the way of the operator.

Upon imparting a rocking horizontal motion of the upper support member 72 by means of a manual push or pull on the saw support handle 101, both of the rocker arms 60 and 62 are displaced from their neutral vertical position 128 causing relative movement between the trunnion pins 40 and 42 and the slots 80 and 82 and between the connecting pins 56 and the openings 44 and 46. The co-action between these components assures a vertical displacement of the rocker arms 60 and 62 in addition to the lateral rocking movement. This is due to the combined camming effect between the trunnion pins 40 and 42 and the slots 80 and 82 and the rotational movement of the lower portion of the rocker arms 60 and 62 about the horizontal axis 48 and 49. If, for example, the rocker arms 60 and 62 are rocked toward the workpiece 114 or the left as viewed in FIG. 4, the rocker arms 60 and 62 assume an inclined position, while the slots 80 and 82 in the intermediate portion of each rocker arm ride upwardly along the curvature of the trunnion pins 40 and 42; while at the same time, the lower portions of the rocker arms 60 and 62 rotate about the horizontal axis 48 and 49 in a counter-clockwise direction as viewed in FIG. 4. This combined action forces the rocker arms 60 and 62 to ride up vertically, maintaining the upper horizontal axes 66 and 68 in the horizontal plane that they were disposed when the rocker arms 60 and 62 were in their neutral vertical position 128. Thus, as the upper rocker arms 60 and 62 are moved from the neutral position 128 to a position in which the rocker arms 60 and 62 are inclined toward the workpiece 114, the upper support member 72 is maintained in the same horizontal plane. Conversely, if the rocker arms 60 and 62 are moved away from the workpiece 114 or to the right as viewed in FIG. 5 to the position indicated at 132, the rocker arms 60 and 62 assume an inclined position wherein the lower portions thereof rotate in a clockwise direction as viewed in FIG. 5 about the arcuate path 57 defined by slots 44 and 46 forcing the intermediate slotted portions 80 and 82 of the rocker arms 60 and 62 respectively to ride up vertically with respect to the trunnion pins 40 and 42. The upper support member 72 is maintained in a horizontal plane as it is shifted from a neutral position 128 to a position spaced away from the workpiece 114. Thus, in either a rocking motion to or away from the workpiece 114, there is a relative rise imparted to the rocker arms 60 and 62 due to the unique pivot and cam action between the slots 80 and 82 and trunnion pins 40 and 42 and the unique rotational movement of the rocker arms 60 and 62 with respect to the horizontal axes 48 and 49. Any point on the upper support member 72 during a rocking motion thereof will describe a straight horizontal line in contrast to a point on a conventional rocker arm construction having a fixed pivot arrangement which obviously would follow a curved path; that is, the point would describe an arc having the fixed pivot point as its center.

The rocker arm 60 carries an adjustable stop member 134 comprising a sleeve member 136 suitably attached to the rocker arm 60 by any means, such as by welding as indicated at 138. The sleeve member 136 is disposed at a right angle with respect to the rocker arm 60 and is located approximately mid-way between the connecting pin 56 and the trunnion pin 69 above the slotted portion 80. The interior of the sleeve member 136 has a threaded surface (not shown) which accommodates a threaded adjusting screw 142. The outer portion 144 of the adjusting screw 142 is adapted to abut the opposing side 146 of the rocker arm 62 after a predetermined amount of rocking motion of the upper support member 72. As can be seen best in FIG. 2, the outer portion 144 of the adjusting screw 142 is spaced a selected distance from the opposing side 146 of the rocker arm 62 when the rocker arms are in the neutral position 128, that is in a substantially vertical position. As can be seen in FIG. 4, when a leftward horizontal movement is imparted upon the upper support member 72, the rocker arms 60 and 62 are inclined with respect to their neutral vertical position 128; the amount of inclination being limited by the abutment of the outer portion 144 of the adjustable screw 142 with the lower position of the opposing side 146. Likewise, as can be best seen in FIG. 5, the amount of inclination of the rocker arms 60 and 62 is limited by the abutment of the outer portion 144 with the upper portion of the opposing side 146 when the upper support member 72 has a horizontal motion imparted thereto which causes the same to be shifted in a rightwardly direction. The amount of inclination of the rocker arms 60 and 62 with respect to their neutral position 128 may be controlled by the amount of engagement of the adjusting screw 142 with the internal threaded surface of the sleeve member 136. When the adjustable screw 142 is threaded outwardly with respect to the sleeve member 136, the amount of inclination of the rocker arms 60 and 62 from the neutral position is decreased and vice versa when the adjustable screw 142 is threaded into the sleeve member 136. Thus, the adjusting screw 142 provides a simple means to control the amount of horizontal stroking motion of the upper support member 72, and thus the amount of horizontal stroking motion of the power saw 90.

It can thus be seen that the present invention provides a structure for use in machines adapted to translate pivotal motion to linear motion.

It can also be seen that a novel cutting apparatus has been described which facilitates the cutting of an end of a workpiece, such as webs, diagonals, cords or the like, by providing a power saw which is pivotable about a vertical axis with respect to the longitudinal axis of the workpiece and having a unique travel mechanism incorporating the structure of the present invention which permits back and forth rocking motion of a saw in a horizontal plane.

While the form of the embodiment of the invention as herein disclosed constitutes a preferred form, it is to be understood that other forms might be adopted, all coming within the spirit of the invention and the scope of the appended claims.

What is claimed is as follows:

1. An apparatus for cutting an elongated workpiece comprising:
    a longitudinal support frame;
    a cutting station associated with said support frame;
    means to support and align said elongated workpiece on said support frame relative to said cutting station, said cutting station having a first support member mounted for rotational movement about a vertical axis;
    a second support member vertically displaced from said first support member;
    saw means carried by said second support member;
    a pair of parallel horizontally spaced rocker arms;
    means for connecting an upper portion of each of said rocker arms to said second support member for relative rotational movement about a pair of horizontal axes displaced by a predetermined amount;
    a pair of arm members;
    means for connecting one end of each arm member to said first support member for relative rotational movement about a second pair of horizontal axes displaced by said predetermined amount;
    means for respectively connecting the other ends of one of said arm members to a lower portion of one of said rocker arms for relative rotational movement, and for connecting the other end of the other of said arm members to a lower portion of the other of said rocker arms for relative rotational movement, said lower portions of said rocker arms being adapted to rotate back and forth along an arcuate path defined by the rotational movement of said arm members about said second pair of horizontal axes; and
    means for pivotally mounting an intermediate portion of each of said rocker arms to said first support member, whereby said second support member is adapted for stroking movement in a horizontal plane defined by said first mentioned horizontal axes.

2. The apparatus as defined in claim 1 wherein said first support member includes an upright portion, said rocker arms being disposed on one side thereof, said arm members being rotatably mounted to the opposite side of said upright portion; a pair of arcuate openings formed in said upright portion along the arcuate path defined by the rotational movement of said arm member about said second pair of horizontal axes; a pair of connecting pins respectively disposed in said arcuate opening, one of said connecting pins connecting said one of said rocker arms to one of said arm members, the other of said pins connecting said other rocker arm to said other arm member for relative rotational movement.

3. The apparatus as defined in claim 2 including a pair of pivot pins carried by said upright portion and vertically displaced respectively from said second horizontal axes; means forming a slot in each of said rocker arms, said slots respectively engaging said pair of pivot pins for causing said pivotal movement between said rocker arm and said first support member.

4. The apparatus as defined in claim 2 wherein the distance between said second horizontal axes and the axis of rotation between the other end of each of said arm members and said rocker arms is equal; said arcuate openings being circular and having arcuate axes, formed about a center point coinciding with said second horizontal axes, said connecting pins being so sized with respect to said arcuate openings that said pins engage said openings in a rolling sliding engagement to support the weight of said rocker arms as said rocker arms rotate back and forth along said arcuate path.

5. The apparatus as defined in claim 4 wherein said connecting pins are adapted for rotational movement relative to both said rocker arms and said arm members.

6. The apparatus as defined in claim 3 wherein said slot means are elongated slots formed at each of said rocker arms, the longitudinal axis of each of said elongated slots lying in a plane defined by said first horizontal axis and the axis of rotation of said rocker arm and said arm member, said pivot pins being carried by said upright portion and being vertically displaced from said second horizontal axis by equal predetermined amounts and being horizontally displaced by an amount equal to said first mentioned predetermined amount.

7. The apparatus as defined in claim 1 including a stop member carried by one of said rocker arms and extending toward the other of said rocker arms, the extended end of said stop member normally being displaced from said other rocker arm when said rocker arms are in a vertically disposed position, said other rocker arm engaging said extended end of said stop member to limit the amount of horizontal movement of said second support member after said rocker arms have been displaced from said vertical position by a predetermined amount.

8. The apparatus as defined in claim 7 wherein the extended end of said stop member is adapted to be selectively positioned with respect to said one rocker arm so as to vary the distance between said extended end and said other rocker arm amount the mount of horizontal movement of said support rocker arms from said vertical position to an inclined position is variably adjustable thereby permitting an adjustment of the amount of horizontal movement of said second support member.

9. The apparatus as defined in claim 8 wherein said stop member is connected to said one rocker arm at a substantially right angle.

10. The apparatus as defined in claim 1 wherein said saw means is carried at one end of said second support member and mounted for pivotable movement about a horizontal axis, whereby said saw means may be raised and lowered about said last mentioned horizontal axis with respect to said second support member independent of the horizontal movement of said second support member.

11. The apparatus as defined in claim 10 wherein said saw means is adapted to be pivoted from a first non-operative position to a second operative position, wherein said saw engages said workpiece for cutting said workpiece at a selected angle with respect to longitudinal axis of said workpiece; and means biasing said saw to said first non-operative position.

12. The apparatus as defined in claim 11 wherein said biasing means comprises a spring, one end of which is carried by said first support member, the other end of which is carried by said second support member.

13. An apparatus for supporting a member for movement in a predetermined plane, comprising:
a first support member;
a second support member displaced from said first support member;
a pair of parallel, spaced rocker arms;
means for connecting one end portion of each of said rocker arms to said first support member for relative rotational movement about a pair of parallel axes displaced by a predetermined amount;
means connecting an opposite end portion of each of said rocker arms to said second support member for relative rotational movement of said opposite end portions of said rocker arms along an arcuate path, each arcuate path defined by equal radii from a second pair of parallel axes disposed on said second support member, said second pair of parallel axes being displaced by said predetermined amount; and
means for pivotally mounting an intermediate portion of each of said rocker arms to said second support member whereby one of said support members is adapted for movement in said predetermined plane, said predetermined plane being parallel to another plane defined by one of said pair of parallel axes.

14. An apparatus for supporting a member for back and forth stroking movement in a horizontal plane, comprising:
a first support member;
a second support member vertically displaced beneath said first support member;
a pair of parallel horizontally spaced rocker arms;
means for connecting an upper portion of each of said rocker arms to said first support member for relative rotational movement about a pair of horizontal axes displaced by a predetermined amount;
a pair of arm members;
means for connecting one end of each arm member to said second support member for relative rotational movement about a second pair of horizontal axes displaced by said predetermined amount;
means respectively connecting the other ends of one of said arm members to a lower portion of one of said rocker arms for relative rotational movement and for connecting the other end for the other of said arm members to a lower portion of the other of said rocker arms for relative rotational movement, said lower portions of said rocker arms being adapted to rotate back and forth along an arcuate path defined by the rotational movement of said arm members about said second pair of horizontal axes; and
means for pivotally mounting an intermediate portion of each of said rocker arms to said second support member whereby said first support member is adapted for stroking movement in a horizontal plane defined by said first mentioned horizontal axes.

* * * * *

UNITED STATES PATENT OFFICE
CERTIFICATE OF CORRECTION

Patent No. 3,680,609        Dated  August 1, 1972

Inventor(s)    Donald C. Menge

It is certified that error appears in the above-identified patent and that said Letters Patent are hereby corrected as shown below:

IN THE SPECIFICATION:

Column 4, line 30, change "portion 5" to --portions-- line 59, change "to" to --on--

IN THE CLAIMS:

Column 9, line 46, delete "amount the mount" and insert therefore --whereby the amount--

Signed and sealed this 2nd day of January 1973.

(SEAL)
Attest:

EDWARD M. FLETCHER, JR.  
Attesting Officer

ROBERT GOTTSCHALK  
Commissioner of Patents